Figure 6:
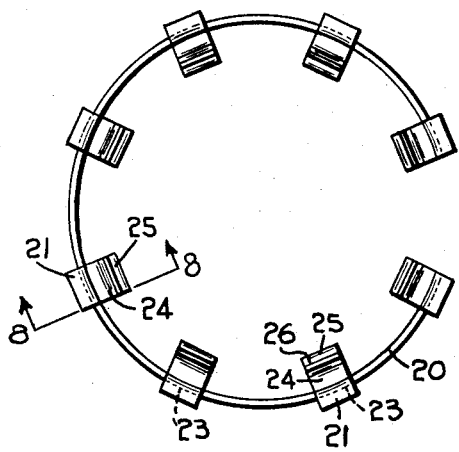

Feb. 17, 1959 S. M. DEL CAMP 2,874,342
TUBE SOCKET AND CAPACITOR ASSEMBLY
Filed June 23, 1953 2 Sheets-Sheet 1
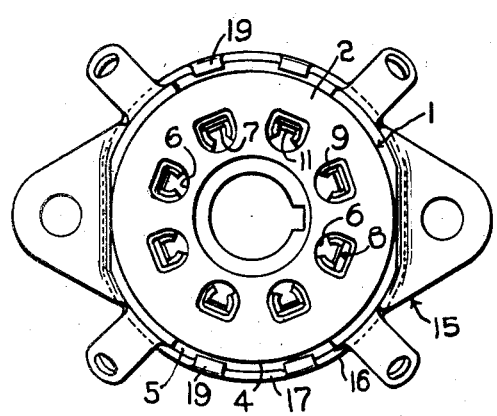
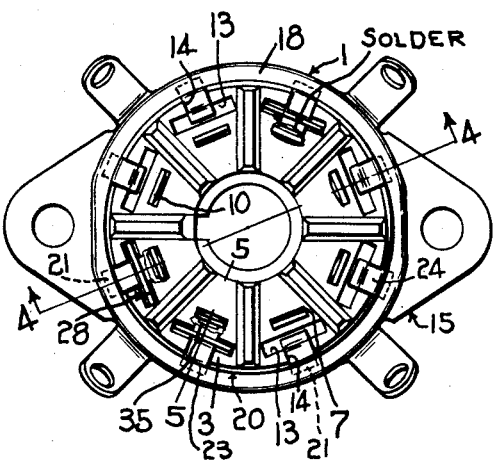
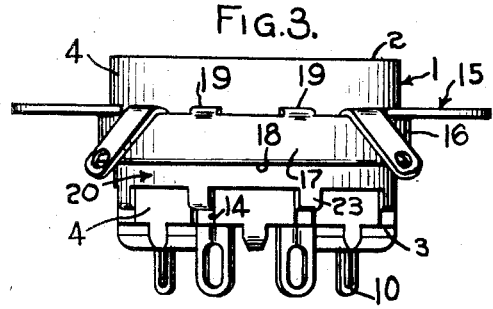
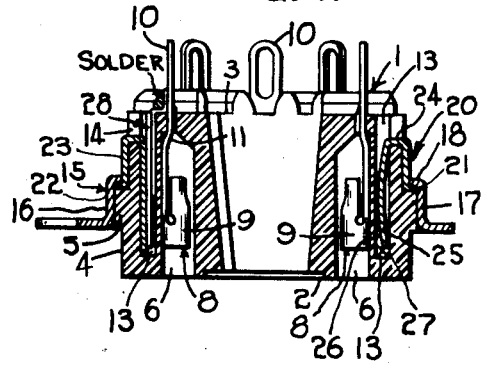
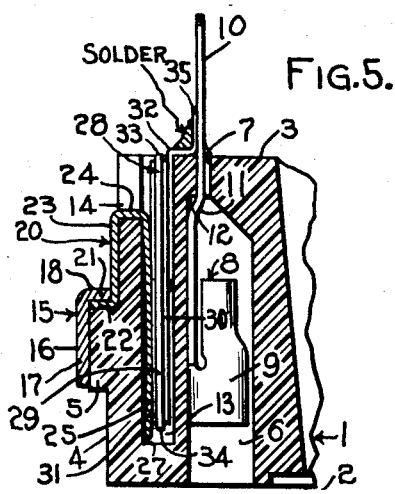
INVENTOR:
SCIPIONE M. DELCAMP,
BY John Todd
ATTORNEY.

Feb. 17, 1959 S. M. DEL CAMP 2,874,342
TUBE SOCKET AND CAPACITOR ASSEMBLY
Filed June 23, 1953 2 Sheets-Sheet 2

INVENTOR:
SCIPIONE M. DEL CAMP,
BY John Todd
ATTORNEY.

United States Patent Office 2,874,342
Patented Feb. 17, 1959

2,874,342

TUBE SOCKET AND CAPACITOR ASSEMBLY

Scipione M. Del Camp, Maywood, Ill., assignor to Cinch Manufacturing Corporation, Chicago, Ill., a corporation of Illinois Application June 23, 1953, Serial No. 363,605

1 Claim. (Cl. 317—257)

This invention relates to an improved socket for electronic tubes having capacitors provided as part of the socket unit. The broad idea of a tube socket having so-called built-in capacitors is not new as several types of such a socket are disclosed in the prior art and one form, at least, has been marketed for several years. The aim of the present invention is the provision of a socket with built-in capacitors which overcomes some of the objections and failures which have been attributed to these known types of sockets.

Thus, after the known types of socket with built-in capacitors have been wired into an electronic circuit, it is extremely difficult to replace a capacitor which has failed without removing the entire socket unit and replacing it with a new or reconstructed socket. The effort entailed in unsoldering the leads to remove the socket unit and then resoldering the leads after the unit has been replaced effects a substantial burden especially in the field. The main objective of the present invention is the provision of a socket constructed to enable individual capacitors to be replaced without the necessity of removing and replacing the entire socket unit. With the present invention, a capacitor which has failed may be replaced by simply unsoldering the electrical connection between the capacitor and contact. Thereafter, the faulty capacitor may be replaced and the connection resoldered to provide a socket unit capable of efficient operation. This arrangement enabling individual capacitors to be replaced is particularly desirable in defense end products due to the fact that, not only can repairs be made with maximum speed in the field, but it is necessary to carry as maintenance stock individual capacitors only thereby eliminating the burden of having in stock socket units of varying arrangements of capacitors and contacts assuring that a socket equivalent to the faulty one is at hand.

Other objects and uses of the invention will be apparent from inspection of the drawings and specification hereinbelow set forth.

Figure 7:
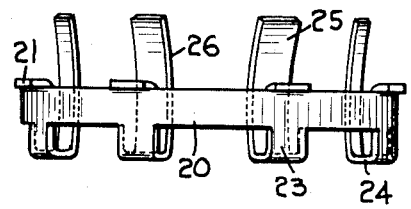
Figure 9:
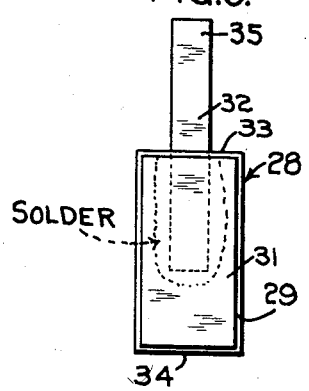
Figure 8:
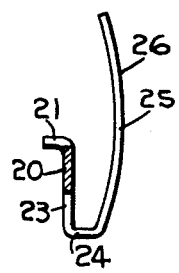
Figure 10:
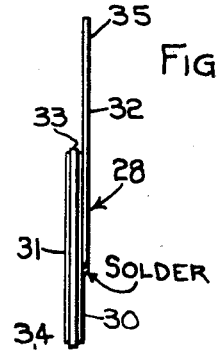

Referring to the drawing in which I illustrated a preferred embodiment of the invention:

Fig. 1 is a top view of a socket unit providing the improved capacitor assembly, Fig. 2 is a bottom view of the socket unit shown in Fig. 1, Fig. 3 is a side view of the socket unit shown in Fig. 1, Fig. 4 is a section taken along the line 4—4 of Fig. 2, Fig. 5 is an enlarged section taken along the line 5—5 of Fig. 2, Fig. 6 is an end elevation of the grounding ring forming a part of the socket unit, Fig. 7 is a side elevation of the grounding ring, Fig. 8 is a section taken along line 8—8 of Fig. 6, Fig. 9 is a front elevation of a preferred form of capacitor assembled in the improved socket unit, and Fig. 10 is a side elevation of the capacitor shown in Fig. 9.

Referring to the preferred embodiment of the invention illustrated in the drawing, the improved socket unit has a one piece insulating casting or body 1 having a top face 2 and a bottom face 3. The casting has a circumferential sidewall 4 providing a generally annular projecting rib 5 for a purpose to be described. A series of contact-receiving openings are formed in the top face 2 which have recesses 6 for receiving the prongs of a cooperating tube member (not shown) and slits 7 extending from the recesses 6 and intersecting the bottom face 3 of the socket body. The socket body carries contact members 8 each of which has a prong-engaging element 9 seated within a recess 6 and a tail-like terminal element 10 which projects through a slit 7 to a position beyond the bottom face 3 of the socket body. The terminal element 10 has a jog 11 (Fig. 5) intermediate its length which bottoms on the casting at the innermost portion 12 of the recess 6 so as to limit movement of the contact in the direction of its insertion. The body 1 also has a series of slot-like openings 13 disposed in a substantailly circular arrangement outside the circle-like arrangement of the slits 7. Each of the openings 13 is disposed in spaced related relation to one of the slits 7 and each slit is preferably positioned in centered, parallel relation to its respective opening 13. The side wall 4 has a notch 14 in communication with each of the openings 13 adjacent the bottom surface 3 of the body.

The socket unit is preferably secured to a supporting structure (not shown) by means of a saddle attaching member 15 providing a well or cup shaped element 16 comprising an annular portion 17 which embraces the rib portion 5 of the casting and an inturned flange portion 18 which is disposed beneath the lower end of the portion 5. Lug elements 19 integral with the portion 17 preferably engage the upper surface of the rib element 5 and cooperate with the flange portion 18 to secure the attaching member to the socket body. As a means for connecting electrically the attaching member 15 with the capacitors carried by the socket body, there is provided a ring-like spring lead part comprising an annular ring portion 20. A series of lug elements 21 extend outwardly from the upper edge of the ring-like portion 20 which, in assembly of the parts of the socket unit, are disposed in clamped electrical engagement with the attaching member 15 between the inturned flange element 18 and the lower surface 22 of the rib-like elements 5 (Figs. 4 and 5). A series of strap elements 23 extend from the lower edge of the ring-like element 20 in substantially the plane thereof. Each of the strap elements 23 has an inwardly turned element 24 at its outermost end which, in final assembly of the parts, projects through the notches 14 of the socket body into the openings 13. Bowed spring elements 25 integral with the outer ends of the elements 24 extend into the openings 13 and, preferably, are of such relative radius that the outer surfaces 26 thereof, before entrance of the capacitors, substantially engage the inner walls 27 of the openings 13 as most clearly shown at the right hand side of Fig. 4.

The capacitors 28 which form a part of the socket unit comprise a thin rectangular plate 29 formed, preferably, of ceramic material. The plate 29 has a width which is slightly less than the width of the openings 13 and a length which is slightly less than the depth of the openings 13. One face of the plate 29 has a silver coating 30 and the opposite face has a silver coating 31. The thickness of the capacitor through the silver coatings is less than the distance between the facing broad walls adjacent the openings 13. A tongue-like metal lead 32 is secured to the coating 30 in electrical engagement therewith as by solder. The element 32 extends beyond the upper end 33 of the capacitor for a purpose to be described.

In assembling the capacitors 28 with the socket member the lower end 34 of the capacitor is moved into an opening 13 with the silver coating 30 adjacent the innermost wall 27 of the opening. As movement of the capacitor into the opening is continued the spring element 25 will be compressed to engage electrically the silver coating 31. The capacitor is pressed downward into the opening 13 until its upper end end 33 lies flush with or is disposed beneath the lower surface 3 of the socket body. Thereafter, the outer end 35 of the lead 32 is soldered to that portion of the terminal 10 of the socket contact 8 adjacent the bottom surface 3 of the socket body. In my preferred embodiment, the end 35 is bent to lie parallel to the terminal 10 as shown in Fig. 5.

As a result of the fact that the ring-like spring lead 20 is electrically engaged with the saddle member 15, the socket contact is bypassed to ground through the capacitor. It will be understood that the capacitors may be disposed in any one or more of the slots 13. If a capacitor fails it is only necessary to unsolder the tongue lead 32 at its junction with the contact tail 10 and remove the component. A new capacitor may then be inserted into the slot and its lead 32 soldered to the tail 10. As a result of the improved construction of the present socket unit, it is not necessary to disturb the leads from the contact terminals into the circuit. An additional advantage of the present construction results from the fact that capacitors may be painted for protection against deteriorating elements. Finally, due to the fact that the present invention effects individual replacement of the capacitor, it is necessary to keep in stock for maintenance of the capacitors only a supply of new capacitors.

Although I have illustrated and described a preferred embodiment of my invention, I do not wish to be limited thereby, because the scope of my invention is best set forth in the following claim.

I claim:

A socket construction for use with a part having contact prongs comprising a socket body of insulating material having top and bottom faces, said body having a plurality of circumferentially spaced passageways extending axially therethrough from the top and bottom surfaces thereof, the opening of each passageway in the bottom face thereof being in the form of a laterally extending slot, prong receiving contact elements positioned within said passageways, each of said contact elements having a terminal portion extending beyond the bottom face of said body, said body having a plurality of laterally slotted recesses circumferentially spaced therein and extending therein from the bottom face thereof, each of said recesses being spaced outwardly from a corresponding passageway and in substantially parallel relationship thereto in cross section, a condenser member having opposed flat sides seated in one of said slotted recesses, said condenser having electrode coatings on opposed sides, a conducting ring encircling said socket body in assembled relationship therewith, a flat strip lead element connected along one end portion in electrical engagement with the electrode coating on one side of said condenser, with the other end portion thereof extending below the bottom of the socket in electrical engagement with the terminal portion of said contact element seated in the related passageway, a second lead element in electrical connection at one end portion to said conducting ring with the opposite end portion electrically engaging the other of said electrode coatings of said condenser, said second lead element comprising an annular ring portion in engagement with the socket body and having a series of lug elements extending outwardly from the upper edge thereof, said lug elements being in clamped electrical engagement with said conducting ring, a series of reverse bend elements extending from the opposite edge of the ring portion in the same plane thereof and in a direction opposite to said lug elements, said reverse bend elements each having a resilient end portion extending into one of said recesses and engaging under spring tension said other electrode coating for electrical connection thereto.

References Cited in the file of this patent

UNITED STATES PATENTS

| | | |
|---|---|---|
| 2,098,747 | Henning | Nov. 9, 1937 |
| 2,352,618 | Daenz | July 4, 1944 |
| 2,377,893 | Lorenzen | June 12, 1945 |
| 2,461,658 | Roup | Feb. 15, 1949 |